United States Patent
Shimamoto et al.

(10) Patent No.: US 12,422,304 B2
(45) Date of Patent: Sep. 23, 2025

(54) INFRARED SENSOR

(71) Applicant: Panasonic Intellectual Property Management Co., Ltd., Osaka (JP)

(72) Inventors: Nobuaki Shimamoto, Fukui (JP); Nayuta Minami, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 380 days.

(21) Appl. No.: 18/019,994

(22) PCT Filed: Apr. 12, 2021

(86) PCT No.: PCT/JP2021/015139
§ 371 (c)(1),
(2) Date: Feb. 6, 2023

(87) PCT Pub. No.: WO2022/038828
PCT Pub. Date: Feb. 24, 2022

(65) Prior Publication Data
US 2023/0288261 A1  Sep. 14, 2023

(30) Foreign Application Priority Data
Aug. 19, 2020 (JP) .................... 2020-138926

(51) Int. Cl.
*G01J 5/16* (2006.01)
*G01J 5/08* (2022.01)

(52) U.S. Cl.
CPC .............. *G01J 5/16* (2013.01); *G01J 5/0853* (2013.01)

(58) Field of Classification Search
CPC ........ G01J 5/04; G01J 5/06; G01J 5/08; G01J 5/12; G01J 5/16; G01J 5/0853
See application file for complete search history.

(56) References Cited

U.S. PATENT DOCUMENTS 7,005,642 B2 *  2/2006  Nozu ................... G01J 5/16
                                                  250/338.1
9,478,682 B2 * 10/2016  Kirihara ............. H10F 77/60
(Continued)

FOREIGN PATENT DOCUMENTS

JP    H08-316505 A    11/1996
JP    2011-069649 A    4/2011
(Continued)

OTHER PUBLICATIONS

International Search Report dated Jun. 29, 2021 issued in International Patent Application No. PCT/JP2021/015139, with English translation.
(Continued)

*Primary Examiner* — Randy W Gibson
(74) *Attorney, Agent, or Firm* — Rimon P.C.

(57) ABSTRACT

An infrared sensor includes: a package body; an infrared sensor chip mounted on a front surface of the package body; an outside cap made of metal, having a function of transmitting infrared light as a detection target for the infrared sensor chip, and attached to the package body such that the outside cap is in front of, and covers, the infrared sensor chip; an inside cap made of metal, having a function of transmitting the infrared light as the detection target for the infrared sensor chip, and disposed between the package body and the outside cap such that the inside cap is in front of, and covers the infrared sensor chip; and a ground terminal to be connected to external ground. The outside cap is electrically insulated from the inside cap and the infrared sensor chip. The inside cap is electrically connected to the ground terminal.

7 Claims, 11 Drawing Sheets

(56) References Cited

U.S. PATENT DOCUMENTS

| | | | | |
|---|---|---|---|---|
| 9,587,978 | B2* | 3/2017 | Okudo | G01J 1/0411 |
| 10,078,007 | B2* | 9/2018 | Okudo | G01J 1/0407 |
| 2013/0093037 | A1 | 4/2013 | Kirihara et al. | |
| 2014/0291527 | A1* | 10/2014 | Okudo | G01J 5/0831 |
| | | | | 250/353 |
| 2017/0122799 | A1* | 5/2017 | Okudo | G01J 1/0437 |

FOREIGN PATENT DOCUMENTS

| | | |
|---|---|---|
| JP | 2012-008003 A | 1/2012 |
| JP | 2013-186038 A | 9/2013 |
| JP | 2014-098671 A | 5/2014 |
| JP | 2015-200559 A | 11/2015 |
| WO | 2012/117568 A1 | 9/2012 |
| WO | 2018/092795 A1 | 5/2018 |

OTHER PUBLICATIONS

Office Action issued in the corresponding Japanese Patent Application No. 2022-543274, dated Jul. 1, 2025.

\* cited by examiner

INFRARED SENSOR

CROSS-REFERENCE OF RELATED APPLICATIONS

This application is the U.S. National Phase under 35 U.S.C. § 371 of International Patent Application No. PCT/JP2021/015139, filed on Apr. 12, 2021, which in turn claims the benefit of Japanese Patent Application No. 2020-138926, filed on Aug. 19, 2020, the entire disclosures of which Applications are incorporated by reference herein.

TECHNICAL FIELD

The present disclosure generally relates to infrared sensors, and specifically, to an infrared sensor including a package in which an infrared sensor chip is housed.

BACKGROUND ART

Patent Literature 1 discloses an infrared sensor. The infrared sensor includes an infrared detection element, a package, and an infrared lens.

The package includes a substrate and an outside cover. The infrared detection element is mounted on the substrate. The outside cover has a peripheral part which is connected via a metal ring to the substrate by welding such that the outside cover can be connected to a ground potential of a motherboard on which the infrared sensor is mounted. The outside cover has an upper portion having a tubular part protruding toward an outside of the package. The tubular part has a tip end having a hole (window part) through which infrared light is to pass. The infrared lens is attached to the outside cover such that the infrared lens closes a base of the tubular part of the outside cover. The infrared lens concentrates the infrared light onto the infrared detection element.

CITATION LIST

Patent Literature

Patent Literature 1: JP 2015-200559 A

SUMMARY OF INVENTION

In such an infrared sensor described in Patent Literature 1, it may be desired to suppress an electrical influence from the outside cover on a surrounding environment caused of a variation in a ground potential of the motherboard on which the infrared sensor is mounted.

In view of the foregoing, it is an object of the present disclosure to provide an infrared sensor configured to suppress an electrical influence on a surrounding environment.

An infrared sensor according to an aspect of the present disclosure includes a package body, an infrared sensor chip, an outside cap, and an inside cap. The outside cap is electrically conductive. the infrared sensor chip is mounted on a front surface of the package body. The outside cap is attached to the package body such that the outside cap is in front of, and covers, the infrared sensor chip. The outside cap has a function of transmitting infrared light which is a detection target to be detected by the infrared sensor chip. The inside cap is electrically conductive. The inside cap is disposed between the package body and the outside cap such that the inside cap is in front of, and covers, the infrared sensor chip. The inside cap has a function of transmitting the infrared light which is the detection target to be detected by the infrared sensor chip. The package body includes a ground terminal to be connected to external ground. The outside cap is electrically insulated from the inside cap and the infrared sensor chip. The inside cap is electrically connected to the ground terminal.

DESCRIPTION OF EMBODIMENTS

An infrared sensor 100 according to an embodiment will be described below with reference to the attached drawings. Figures described in the following embodiment are schematic views. The ratio of sizes and the ratio of thicknesses of components in the figures do not necessarily reflect actual dimensional ratios.

(1) Overview

Figure 1:
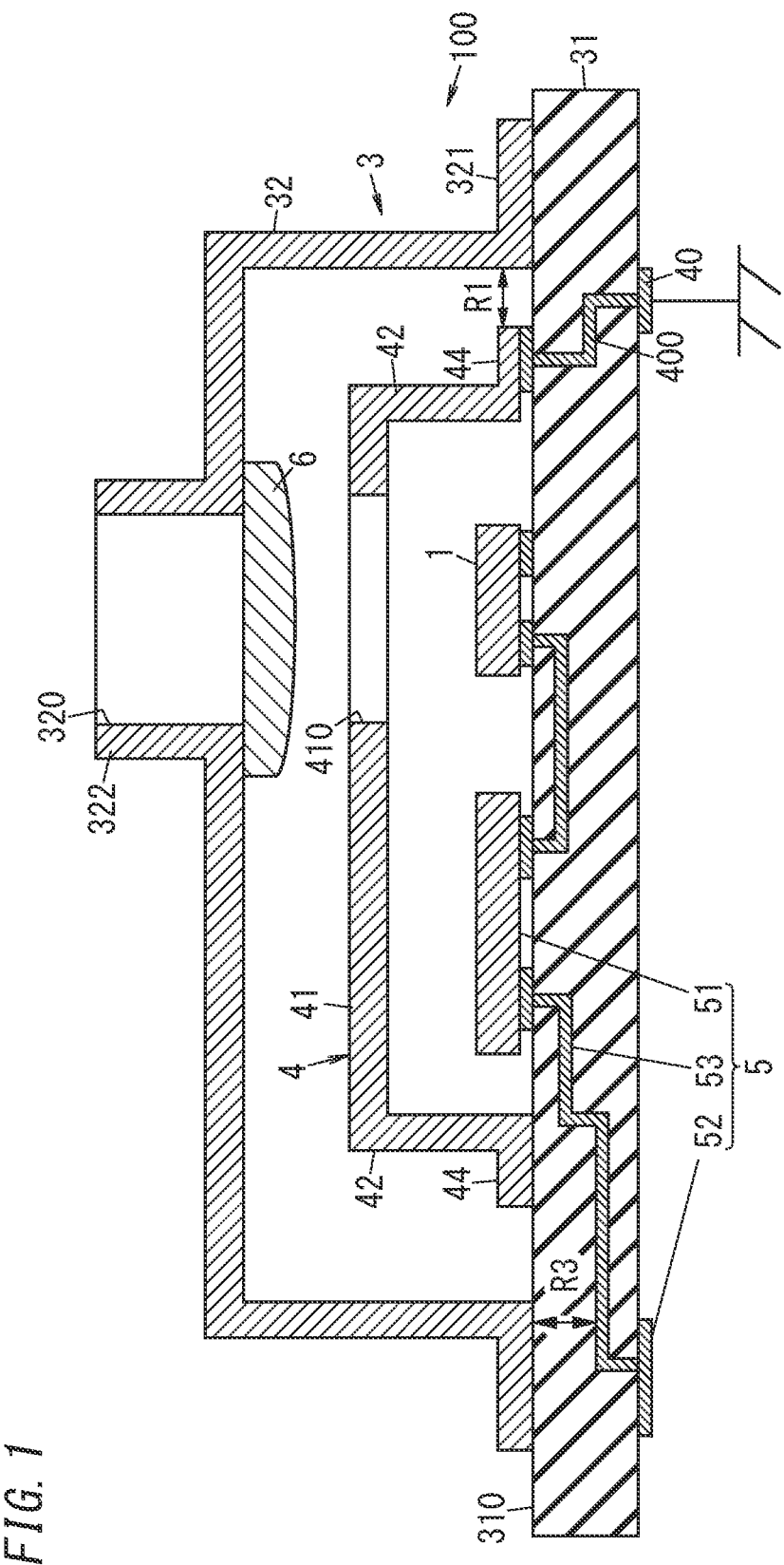
FIG. 1 is a schematic sectional view of an overview of an infrared sensor according to an embodiment of the present disclosure.
Figure 2:
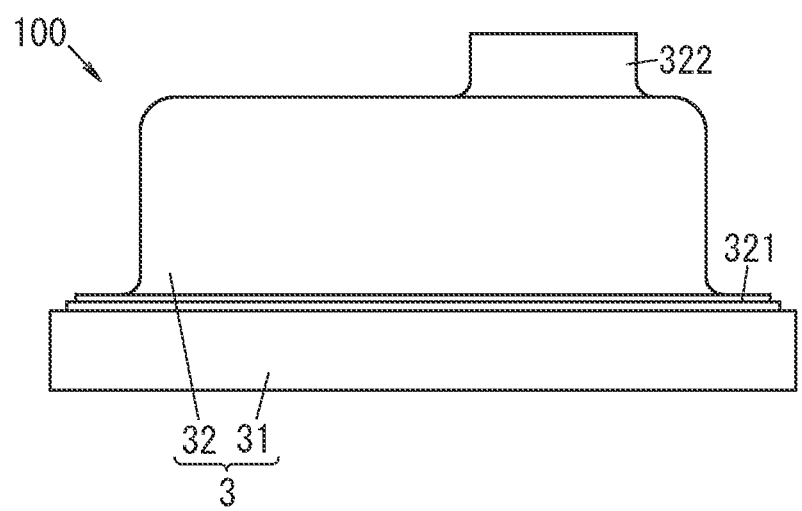
FIG. 2 is a side view of the infrared sensor.

As shown in FIG. 1, the infrared sensor 100 of the present embodiment includes an infrared sensor chip 1, a package body 31, and an outside cap 32.

The infrared sensor chip 1 is mounted on one principal surface of the package body 31. In the following description, the orientation (upward direction in FIG. 1) of a visual field of the infrared sensor chip 1 is referred to as a "front", and an orientation (downward direction in FIG. 1) opposite to the "front" is referred to as a "back". Thus, of the package body 31, the one principal surface, on which the infrared sensor chip 1 is mounted, corresponds to a front surface 310 of the package body 31. However, these orientations are defined for the sake of convenience to explain the positional relationship between components and do not limit the orientation and the like of the infrared sensor 100 in use.

The package body 31 includes a ground terminal 40. The ground terminal 40 is a terminal to be connected to external ground (e.g., a ground potential of a motherboard on which the infrared sensor 100 is to be mounted).

The outside cap 32 is attached the package body 31 such that the outside cap 32 is in front of, and covers, the infrared sensor chip 1. The outside cap 32 is electrically conductive. The outside cap 32 is made of, for example, metal. The outside cap 32 has a function of transmitting infrared light which is a detection target to be detected by the infrared sensor chip 1. Here, the outside cap 32 has an opening 320 in front of the infrared sensor chip 1 and allows the infrared light as the detection target to pass through the opening 320. That is, "the outside cap 32 has a function of transmitting infrared light which is a detection target to be detected by the infrared sensor chip 1" means, in this embodiment, that the outside cap 32 has the opening 320 in front of the infrared sensor chip 1.

The infrared sensor 100 further includes an inside cap 4.

The inside cap 4 is disposed between the package body 31 and the outside cap 32 such that the inside cap 4 is in front of, and covers, the infrared sensor chip 1. The inside cap 4 is electrically conductive. The inside cap 4 is made of, for example, metal. The inside cap 4 has a function of transmitting infrared light which is a detection target to be detected by the infrared sensor chip 1. Here, the inside cap 4 has an opening 410 in front of the infrared sensor chip 1 and allows the infrared light as the detection target to pass through the opening 410. That is, "the inside cap 4 has a function of transmitting infrared light which is a detection target to be detected by the infrared sensor chip 1" means, in this embodiment, that the inside cap 4 has the opening 410 in front of the infrared sensor chip 1.

In the infrared sensor 100 of the present embodiment, the outside cap 32 is electrically connected to neither the inside cap 4 nor the infrared sensor chip 1. In other words, the outside cap 32 is electrically insulated from the inside cap 4 and the infrared sensor chip 1. On the other hand, the inside cap 4 is electrically connected to the ground terminal 40. Here, as shown in FIG. 1, the inside cap 4 is electrically connected to the ground terminal 40 of the package body 31 via a ground line 400 which is one of conductive parts of the package body 31.

In the conventional infrared sensor described in Patent Literature 1, the outside cover is connected to a ground terminal. The ground terminal is to be connected to, for example, a ground potential of the motherboard on which the infrared sensor is to be mounted. Thus, if the ground potential of the motherboard varies, the outside cover may exert an electrical influence on a surrounding environment along with the variation in the ground potential. For example, when a foreign substance comes into contact with the outside cover, the foreign substance may electrically be influenced by the outside cover. Thus, the conventional infrared sensor includes a protection cover disposed in front of the outside cover so that the outside cover does not exert the electrical influence on the surrounding environment.

In contrast, in the infrared sensor 100 of the present embodiment, the inside cap 4 is electrically connected to the ground terminal 40. Moreover, the outside cap 32 is in a so-called floating state in which the outside cap 32 is electrically insulated from ground and the infrared sensor chip 1. Thus, even when the ground potential of the motherboard connected to the ground terminal 40 varies, the potential of the outside cap 32 is less likely to vary. Thus, the infrared sensor 100 of the present embodiment has the advantage that the electrical influence on a surrounding environment can be suppressed (reduced).

Moreover, the conventional infrared sensor includes the protection cover. Thus, in the conventional infrared sensor, the infrared light as the detection target is attenuated when the infrared light passes through the protection cover, which may reduce the detection accuracy of the infrared light. In contrast, the infrared sensor 100 of the present embodiment requires no protection cover and thus has the advantage that the detection accuracy is improved compared to the conventional infrared sensor including the protection cover. Moreover, that the protection cover is not required contributes to cost reduction compared to the conventional infrared sensor including the protection cover.

(2) Details

The infrared sensor 100 of the present embodiment will be described in further detail below with reference to the drawings.

As shown in FIGS. 1 to 4, the infrared sensor 100 includes the infrared sensor chip 1, an IC chip 51, a package 3, the inside cap 4, and a lens 6. The package 3 includes the package body 31 and the outside cap 32. The package body 31 includes the ground terminal 40 and a connection terminal 52. As shown in FIG. 1, the infrared sensor chip 1 and the IC chip 51 are mounted on the front surface 310 of the package body 31.

In the following description, for convenience of explanation, the forward/backward direction (a direction along the visual field of the infrared sensor chip 1) is also referred to as a "first direction D1". Moreover, a direction which is orthogonal to the first direction D1 and in which the infrared sensor chip 1 and the IC chip 51 are aligned with each other is also referred to as a "second direction D2". Further, a direction orthogonal to both the first direction D1 and the second direction D2 is referred to as a "third direction D3".

Note that in FIG. 1, in order to make it easier to understand the connection relationship between components, the infrared sensor chip 1 and the IC chip 51 are shown as if they were flip-chip mounted on the package body 31. However, in the present embodiment, as explained below, the infrared sensor chip 1 and the IC chip 51 are electrically connected to a wiring part of the package body 31 by wire bonding. Naturally, in another aspect of the present disclosure, the infrared sensor chip 1 and/or the IC chip 51 may be flip-chip mounted on the package body 31.

(2.1) Infrared Sensor Chip

Figure 4:
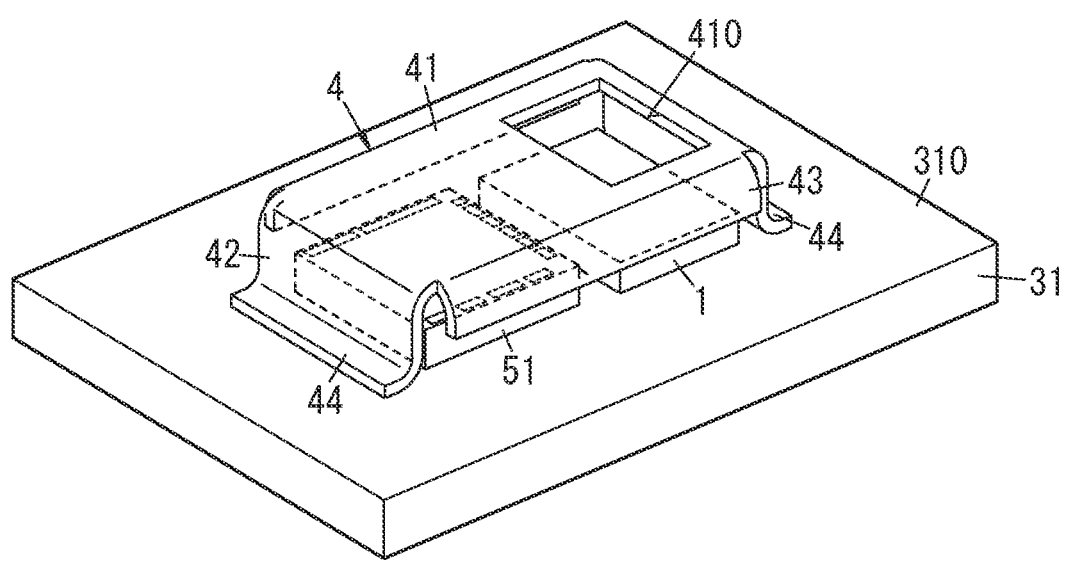
FIG. 4 is a perspective view of the infrared sensor whose outside cap is detached.

As shown in FIG. 4, the infrared sensor chip 1 is mounted on the front surface 310 of the package body 31.

Figure 5:
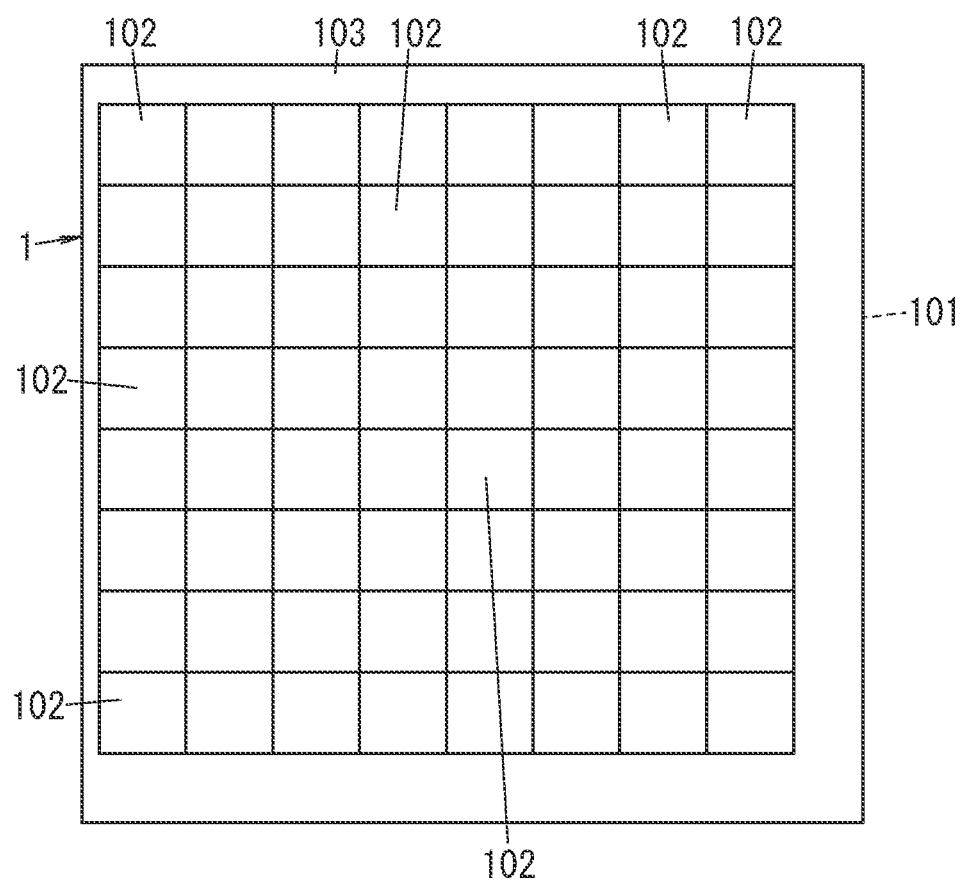
FIG. 5 is a layout diagram of a plurality of pixels in an infrared sensor chip included in the infrared sensor.

As shown in FIG. 5, the infrared sensor chip 1 includes a substrate 101 and a plurality of (e.g., 64) pixels 102. The substrate 101 is a silicon substrate. The plurality of pixels 102 are disposed on a first principal surface 111 (see FIG. 6) of the substrate 101. The outer peripheral shape of the infrared sensor chip 1 viewed in plan in a thickness direction defined with respect to the substrate 101 is, for example, rectangular shape. The outer peripheral shape of the infrared sensor chip 1 may be, for example, oblong or square.

The plurality of pixels 102 are arranged in an array at the side of the first principal surface 111 of the substrate 101. More specifically, the plurality of (in the example shown in FIG. 5, 64) pixels 102 are arranged in a two-dimensional array of "m" rows and "n" columns (each of "m" and "n" is a natural number: in the example shown in FIGS. 5, m=8, and n=8).

The infrared sensor chip 1 includes a membrane structural component 103 constituting parts of the plurality of pixels 102. The membrane structural component 103 is supported by the substrate 101 at the side of the first principal surface 111 of the substrate 101.

Figure 6:
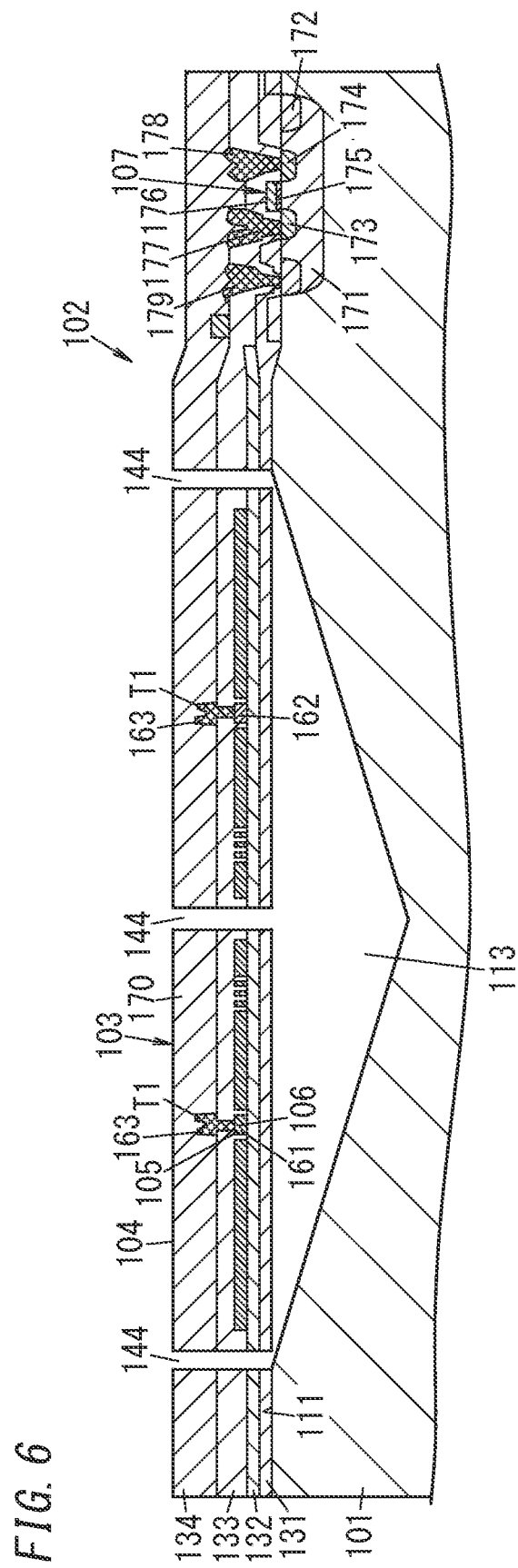
FIG. 6 is a sectional view of the pixel of the infrared sensor chip.
Figure 7:
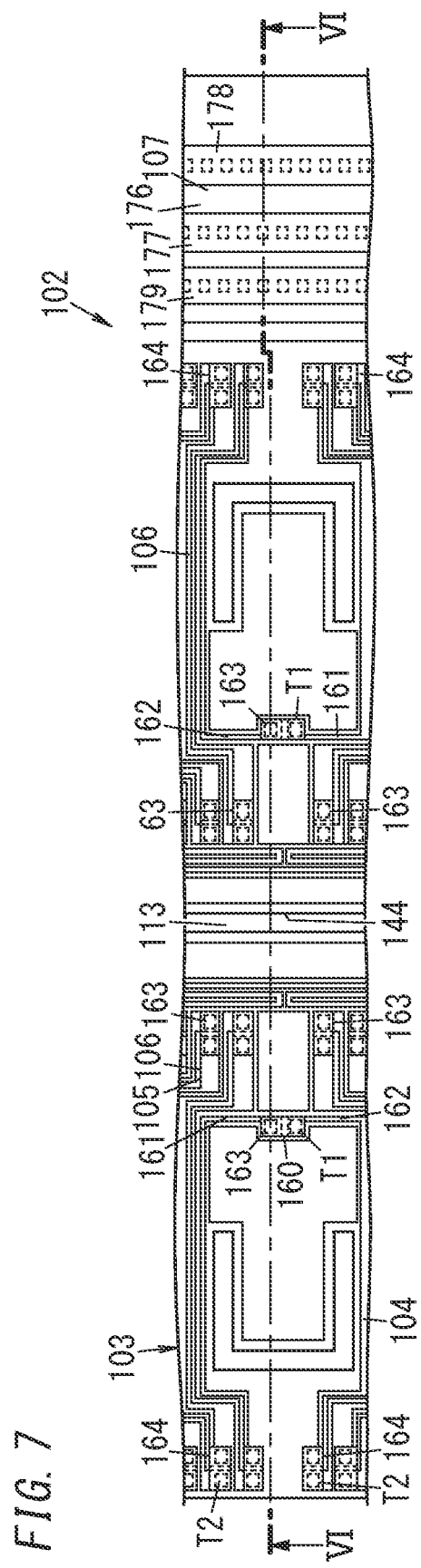
FIG. 7 is a partially cutaway plan view of the pixel of the infrared sensor chip.

As shown in FIGS. 6 and 7, the membrane structural component 103 includes a silicon oxide film 131, a silicon nitride film 132, an interlayer insulative film 133, and a passivation film 134. In the membrane structural component 103, the silicon oxide film 131, the silicon nitride film 132, the interlayer insulative film 133, and the passivation film 134 are aligned in this order from the side of the substrate 101. The silicon oxide film 131 is directly supported by the substrate 101. Note that FIG. 6 is a sectional view along line VI-VI of FIG. 7.

The membrane structural component 103 includes a plurality of (64) thermal infrared detectors 104 corresponding to the plurality of (64) pixels 102 on a one-to-one basis. The plurality of thermal infrared detectors 104 are arranged in a two-dimensional array of "m" rows and "n" columns (8 rows and 8 columns) at the side of the first principal surface 111 of the substrate 101. Each of the plurality of thermal infrared detectors 104 is included in a corresponding one pixel 102 of the plurality of pixels 102.

Each of the plurality of thermal infrared detectors 104 in the membrane structural component 103 includes a thermoelectric converter 105 formed on the silicon nitride film 132. The thermoelectric converter 105 includes a plurality of (e.g., 6) thermopiles 106. In the thermoelectric converter 105, the plurality of thermopiles 106 are connected in series.

The interlayer insulative film 133 covers the thermoelectric converter 105 at a surface of the silicon nitride film 132. The interlayer insulative film 133 is, for example, a Boron Phosphorus Silicon Glass (BPSG) film. The passivation film 134 is, for example, a layered film including a Phospho-Silicate Glass (PSG) film and a Nondoped Silicate Glass (NSG) film formed on the PSG film. Note that in the membrane structural component 103, a layered film includes the interlayer insulative film 133 and the passivation film 134, and a part of the layered film formed in the thermal infrared detector 104 serves as an infrared absorbing film 170.

The substrate 101 has a plurality of cavities 113 (see FIG. 6) provided at the side of the first principal surface 111 and corresponding to the plurality of thermal infrared detectors 104 on a one-to-one basis. The opening shape of each cavity 113 in the first principal surface 111 of the substrate 101 is rectangular. Each of the plurality of cavities 113 of the substrate 101 is formed directly under part of a corresponding thermal infrared detector 104 of the plurality of thermal infrared detectors 104. Thus, part of each of the plurality of thermal infrared detectors 104 is apart from the substrate 101 in the thickness direction defined with respect to the substrate 101. As shown in FIGS. 6 and 7, each thermal infrared detector 104 has a portion which is located on an inner side with respect to an opening edge of a corresponding one of the cavities 13, in plan view, in the thickness direction defined with respect to the substrate 101 and which has a plurality of slits 144 penetrating in the thickness direction defined with respect to the substrate 101 and communicated with the cavity 113.

Each of the plurality of thermal infrared detectors 104 has a portion overlapping corresponding one of the cavities 113 in the thickness direction defined with respect to the substrate 101, and the portion is sectioned into six areas by the plurality of slits 144. The six areas are, for example, disposed in a two-dimensional array of 3 rows and 2 columns. Each of the six areas includes one thermopile 106. Note that in FIG. 7, only two areas of the six areas are shown.

Each thermopile 106 includes a plurality of (here, 9) thermocouples 160. Each of the plurality of thermocouples 160 includes an n-type polysilicon line 161, a p-type polysilicon line 162, and a first connector 163 electrically connecting first ends of the n-type polysilicon line 161 and the p-type polysilicon line 162 to each other. As shown in FIG. 6, the n-type polysilicon line 161 and the p-type polysilicon line 162 are formed on the silicon nitride film 132. A material for the first connector 163 is, for example, an Al—Si alloy. Each thermopile 106 includes a second connector 164 electrically connecting second ends of the n-type polysilicon line 161 and the p-type polysilicon line 162 of adjacent thermocouples 160 of the plurality of thermocouples 160. A material for the second connector 164 is, for example, an Al—Si alloy.

In each thermopile 106, the first end of the n-type polysilicon line 161, the first end of the p-type polysilicon line 162, and the first connector 163 of each of the plurality of thermocouples 160 constitute one hot junction T1. Thus, each thermopile 106 includes a plurality of (9) hot junctions T1. Moreover, in each thermopile 106, the second end of the n-type polysilicon line 161 and the second end of the p-type polysilicon line 162 of two adjacent thermocouples 160, and the second connector 164 constitute one cold junction T2. Thus, each thermopile 106 includes a plurality of (8) cold junctions T2.

Each hot junction T1 of the thermopile 106 is disposed to overlap the cavity 113 in the thickness direction defined with respect to the substrate 101, and each cold junction T2 is disposed not to overlap the cavity 113 in the thickness direction defined with respect to the substrate 101.

As shown in FIG. 6, each of the plurality of pixels 102 includes a MOS transistor 107 in addition to the thermal infrared detector 104. The MOS transistor 107 of each of the plurality of pixels 102 is a switching device for pixel selection. In other words, each of the plurality of MOS transistors 107 is a switching device for taking out an output voltage of the thermoelectric converter 105 included in a corresponding one of the pixels 102. Each MOS transistor 107 includes a well region 171, a drain region 173, a source region 174, a channel stopper region 172, a gate insulative film 175, a gate electrode 176, a drain electrode 177, a source electrode 178, and a ground electrode 179.

The well region 171, the drain region 173, the source region 174, and the channel stopper region 172 are formed in the substrate 101. The gate insulative film 175 is formed on the first principal surface 111 of the substrate 101. The gate electrode 176 is formed on the gate insulative film 175. The drain electrode 177 is formed on the drain region 173. The source electrode 178 is formed on the source region 174. The ground electrode 179 is formed on the channel stopper region 172.

In each of the pixels 102, a first end of the thermoelectric converter 105 is connected via the MOS transistor 107 to a first line (read line). The gate electrode 176 of the MOS transistor 107 is connected to a second line (signal line). The well region 171 is connected to a third line (ground line). A second end of the thermoelectric converter 105 is connected to a fourth line (reference bias line). The source electrode 178 of the MOS transistor 107 is connected via the thermoelectric converter 105 to the fourth line. Thus, in the MOS transistor 107, applying a voltage via the second line to the gate electrodes 176 of the plurality of pixels 2 enables output voltages of the pixels 2 to be read via the first line. The output voltages thus read out of the pixels 2 correspond to a detection signal of the infrared sensor chip 1.

(2.2) IC Chip

As shown in FIG. 4, the IC chip 51 is mounted on the front surface 310 of the package body 31. The IC chip 51 is mounted on the front surface 310 of the package body 31 to be aligned with the infrared sensor chip 1 side by side (in the second direction D2). The IC chip 51 includes a signal processing circuit 510 configured to perform signal processing of the detection signal of the infrared sensor chip 1. That is, the IC chip 51 is configured to perform the signal processing of the detection signal of the infrared sensor chip 1.

Figure 8:
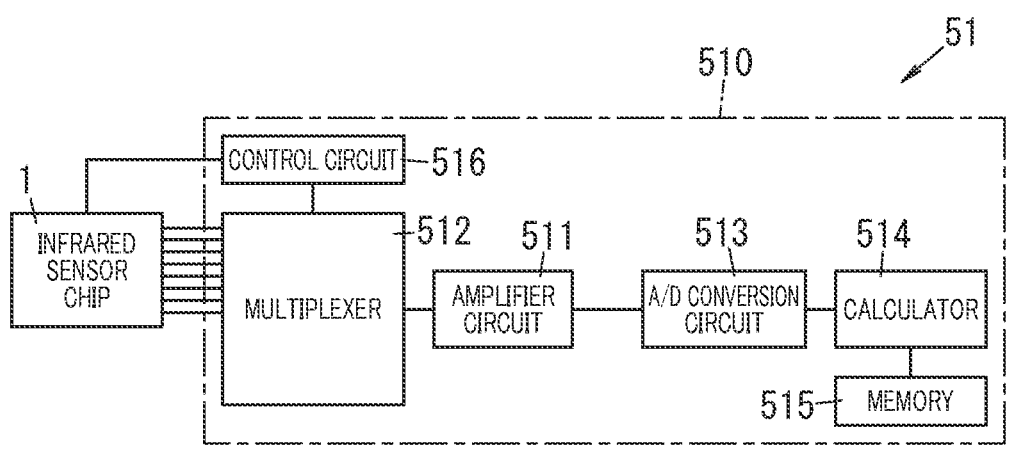
FIG. 8 is a circuit block diagram of the infrared sensor.

As shown in FIG. 8, the signal processing circuit 510 includes an amplifier circuit 511, a multiplexer 512, an A/D conversion circuit 513, a calculator 514, memory 515, and a control circuit 516. The amplifier circuit 511 amplifies the output voltage (detection signal) of the infrared sensor chip 1. The multiplexer 512 selectively inputs one of the output voltages of the thermoelectric converters 105 of the plurality of pixels 102 of the infrared sensor chip 1 to the amplifier circuit 511. The A/D conversion circuit 513 converts the output voltage, amplified in the amplifier circuit 511, of the amplified infrared sensor chip 1 into a digital value. The calculator 514 performs, based on the digital value output from the A/D conversion circuit 513 in accordance with the output voltage of the infrared sensor chip 1, processing to calculate the temperature of an object in a detection area of the infrared sensor 100. The detection area of the infrared sensor 100 depends on, for example, the shape of the lens 6 disposed to face a light receiving surface of the infrared sensor chip 1. The memory 515 stores, for example, data to be used for the calculation performed by the calculator 514. The control circuit 516 controls the plurality of MOS transistors 107 of the infrared sensor chip 1. Note that the circuit configuration of the signal processing circuit 510 is not limited to the configuration shown in FIG. 8.

(2.3) Package

As shown in FIGS. 1 to 4, the package 3 houses the infrared sensor chip 1 and the IC chip 51.

The package 3 includes the package body 31 and the outside cap 32.

The package body 31 has a plate shape having the outer peripheral shape, viewed in plan in a thickness direction defined with respect the package body 31, of a rectangle. The thickness direction defined with respect to the package body 31 is along the first direction D1 (forward/backward direction). The package body 31 includes: an insulating substrate made of, for example, epoxy glass; and conductive parts which are configured for wiring and which are provided to the insulating substrate. The conductive parts include, in this embodiment, electrode pads 80, 81, and 82 (see FIG. 9), a conductor line 53, the ground line 400, the connection terminal 52, and the ground terminal 40 (see FIG. 1). The package body 31 is made from, for example, glass fabric base material epoxy resin copper clad laminate. However, the package body 31 is not limited to this example but may be, for example, a ceramic substrate.

Figure 9:
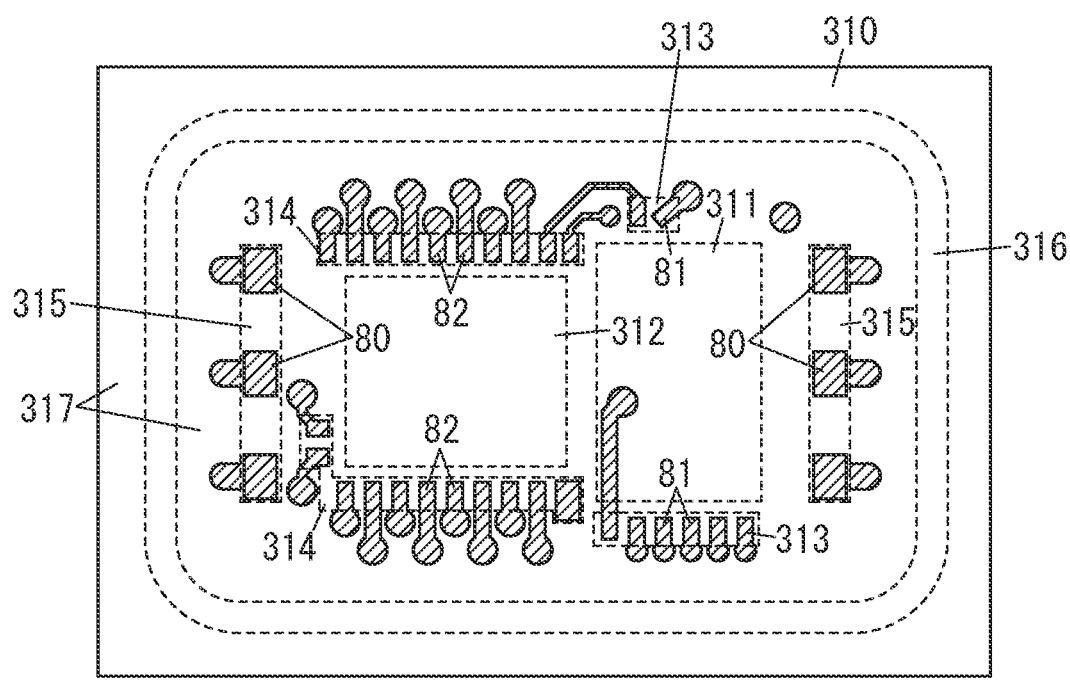
FIG. 9 is a plan view of a package body of the infrared sensor.

As shown in FIG. 9, the front surface 310 of the package body 31 includes a first area 311 to a sixth area 316 and other areas 317.

The first area 311 is an area in which the infrared sensor chip 1 is to be disposed. The first area 311 has a rectangular shape in plan view in the thickness direction defined with respect to the package body 31.

The second area 312 is an area in which the IC chip 51 is to be disposed. The second area 312 has a rectangular shape in plan view in the thickness direction defined with respect to the package body 31.

The third area 313 is an area in which the plurality of electrode pads 81 for connection of wires connected to the infrared sensor chip 1 are mainly to be disposed. In the example shown in FIG. 9, two third areas 313 are included in the front surface 310 of the package body 31. The two third areas 313 are on both sides of the first area 311 (the infrared sensor chip 1) in the third direction D3. The two third areas 313 are provided with the plurality of (a total of 8) electrode pads 81.

The fourth area 314 is an area in which the plurality of electrode pads 82 for connection of wires connected to the IC chip 51 are mainly to be disposed. In the example shown in FIG. 9, two fourth areas 314 are included in the front surface 310 of the package body 31. The two fourth areas 314 are on both sides of the second area 312 (the IC chip 51) in the third direction D3. Note that one (fourth area 314 on a lower side in FIG. 9) of the two fourth areas 314 has a portion at one end (left end in FIG. 9) in the second direction D2 extending along the third direction D3 toward the other of the two fourth areas 314 (upward in FIG. 9). The two fourth areas 314 are provided with the plurality of (a total of 22) electrode pads 82.

The fifth area 315 is an area where the inside cap 4 is to be bonded to the package body 31. In the example shown in FIG. 9, two fifth areas 315 are included in the front surface 310 of the package body 31. The two fifth areas 315 are on both sides of a set of the first area 311 and the second area 312 (the infrared sensor chip 1 and the IC chip 51) in the second direction D2. The two fifth areas 315 are provided with the plurality of (a total of 6) electrode pads 80.

The sixth area 316 is an area where the outside cap 32 is to be bonded to the package body 31. The sixth area 316 is in the shape of a frame (a rectangular frame having curved four corners) having a size surrounding all of the first area 311 to the fifth areas 315.

The package body 31 is, for example, a multilayer substrate and is, in this embodiment, a 4-layer substrate. That is, in the package body 31, the conductive parts are formed in four layers, namely, an outermost layer (the front surface 310 of the package body 31), a first interlayer, a second interlayer, and a back surface. The conductive parts in the layers are connected to each other by via conductors. In FIG. 9, of the conductive parts, parts (including the electrode pads 80, 81, and 82) provided on the front surface 310 (outermost layer) of the package body 31 are indicated by hatch lines. Moreover, as shown in FIG. 1, the connection terminal 52 and the ground terminal 40 of the conductive parts are provided on the back surface of the package body 31. The connection terminal 52 is a terminal to be connected to an external electric circuit. The ground terminal 40 is a terminal to be connected to external ground (e.g., a ground potential of a motherboard on which the infrared sensor 100 is to be mounted).

The infrared sensor chip 1 is mounted in the first area 311 of the front surface 310 of the package body 31. In the infrared sensor 100, a plurality of pad electrodes of the infrared sensor chip 1 are electrically connected to the plurality of electrode pads 81 via wires by, for example, a wire bonding technique. The plurality of electrode pads 81 are individually connected to some electrode pads 82 of the plurality of electrode pads 82 via the conductive parts wired in the package body 31 (e.g., in the outermost layer or the first interlayer) (see FIG. 9). The detection signal of the infrared sensor chip 1 is output to the IC chip 51 via these electrode pads 81 and 82, the conductive parts, the wires, and the like.

The IC chip 51 is mounted in the second area 312 of the front surface 310 of the package body 31. In the infrared sensor 100, a plurality of pad electrodes of the IC chip 51 are electrically connected to the plurality of electrode pads 82 via wires by, for example, a wire bonding technique. Some other electrode pads of the plurality of electrode pads 82 (some of electrode pads 82 which are not connected to the electrode pads 81) are individually connected to a plurality of connection terminals 52 (see FIG. 1: in FIG. 1, only one connection terminal 52 is shown) via conductive parts (the conductor line 53) wired in the package body 31 (e.g., in the first interlayer or the second interlayer). That is, the IC chip 51 is electrically connected to the connection terminals 52 via the conductor line 53 (the conductive part). In other words, the infrared sensor 100 includes an electric circuit 5 including the IC chip 51, the connection terminals 52, and the conductor line 53.

Figure 3:
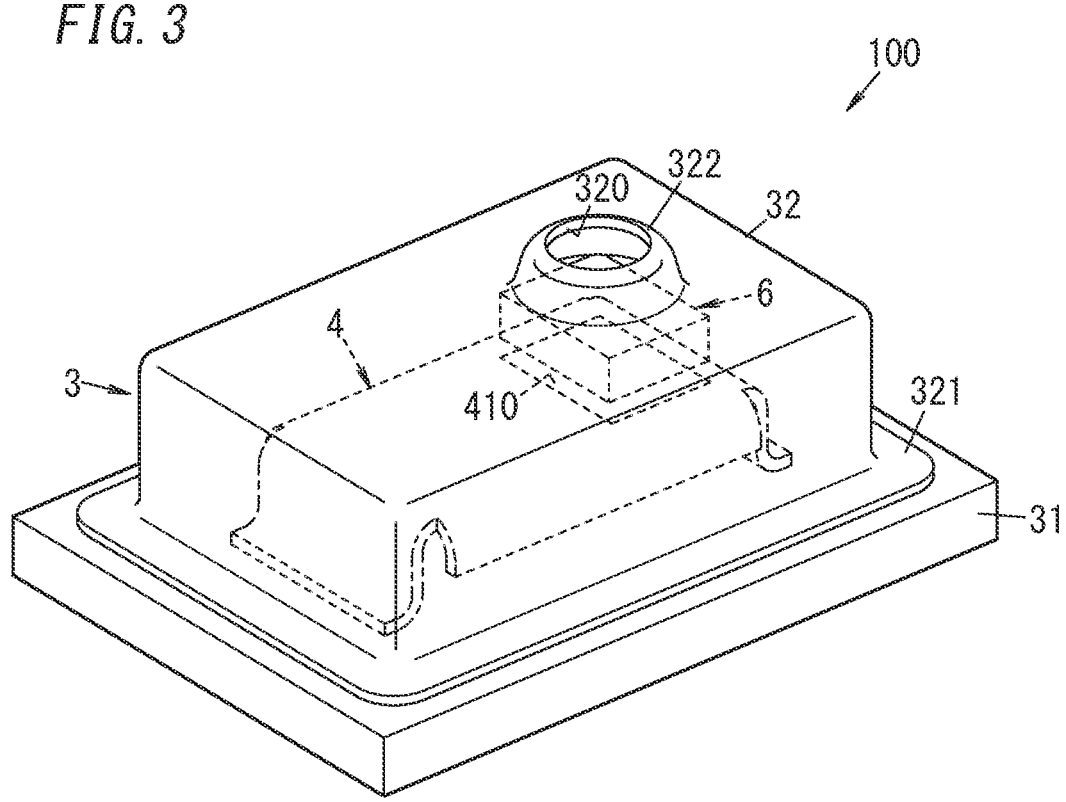
FIG. 3 is a partially transparent perspective view of the infrared sensor.

The outside cap 32 is mounted in the sixth area 316 of the front surface 310 of the package body 31. The outside cap 32 is electrically conductive. The outside cap 32 is made of metal in this embodiment and is made of, for example, stainless steel (SUS). As shown in FIG. 3, the outside cap 32 has a hollow rectangular box shape having an opening in the rear surface thereof. The outside cap 32 is attached to the package body 31 such that the outside cap 32 covers the infrared sensor chip 1 and the IC chip 51. The outside cap 32 has corners and sides which are beveled. The outside cap 32 has an opening edge (rear edge) provided with a flange 321 extending outward and having a rectangular frame shape.

Figure 10:
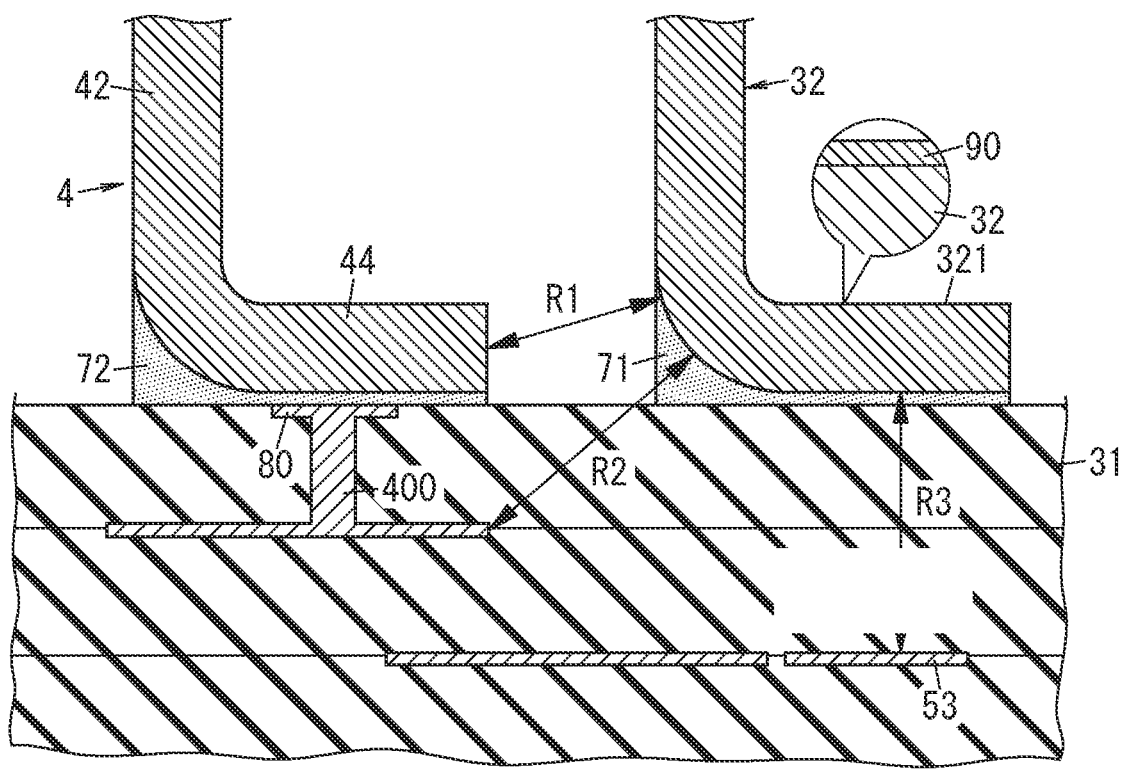
FIG. 10 is a view of an overview of a main part of the infrared sensor.

The outside cap 32 is fixed to the package body 31 by bonding the flange 321 to the sixth area 316 via a first bond part 71 (see FIG. 10). In the case of the outside cap 32, the flange 321 is bonded to the sixth area 316 of the package body 31 over the entire circumference thereof. The first bond part 71 is electrically insulating. The first bond part 71 is made of, for example, a first adhesive which is electrically insulating. The first adhesive may be, for example, a thermally curable adhesive which is temporarily curable by an ultraviolet ray.

The outside cap 32 is electrically insulated from the conductive parts (the conductor line 53 and the ground line 400) of the package body 31. Moreover, the outside cap 32 is electrically insulated from the infrared sensor chip 1. Further, the outside cap 32 is electrically insulated from the IC chip 51.

The outside cap 32 has a front wall having a tubular part 322. The tubular part 322 is formed at a location (in front of the infrared sensor chip 1) on the front wall of the outside cap 32, the location corresponding to the location of the infrared sensor chip 1 in the first direction D1. The tubular part 322 protrudes toward the outside of the package 3 (forward). The tubular part 322 has, for example, a cylindrical shape whose diameter decreases toward the front (as the distance from the infrared sensor chip 1 increases) (see FIGS. 2 and 3). The tubular part 322 is formed by, for example, a drawing process. The tubular part 322 has a front end having the opening 320. The shape of the opening 320 is circular. The opening 320 is a hole through which infrared light as a detection target to be detected by the infrared sensor chip 1 is to pass. In other words, the outside cap 32 has a function of transmitting the infrared light which is the detection target to be detected by the infrared sensor chip 1.

In the outside cap 32, the tubular part 322 has a base end (rear end) provided with the lens 6. That is, the infrared sensor 100 includes the lens 6 disposed in front of the infrared sensor chip 1. The lens 6 closes an opening at the rear end of the tubular part 322. A material for the lens 6 is, for example, silicon. The lens 6 is, for example, an aspheric lens. The lens 6 concentrates the infrared light as the detection target to be detected by the infrared sensor chip 1 onto the infrared sensor chip 1. The lens 6 is bonded to the outside cap 32 with, for example, an electrically conductive material. Since the infrared sensor 100 includes the lens 6, the detection accuracy of the infrared light by the infrared sensor chip 1 is improved.

Fixing the outside cap 32 to the package body 31 forms the package 3 having an airtight internal space.

Since the outside cap 32 includes the tubular part 322, a foreign substance is less likely to come into contact with the lens 6 compared to the case where the tubular part 322 is not provided, and therefore, the lens 6 is protected from being, for example, stained. Thus, the infrared sensor 100 enables the detection accuracy of the infrared sensor chip 1 to be suppressed from being reduced due to the stain on the lens 6.

Moreover, in the infrared sensor 100 of the present embodiment, the size of the opening 320 is appropriately set, thereby providing a function as a so-called "optical diaphragm device".

As described above, the outside cap 32 is made of metal. Thus, the mechanical strength can be improved compared to the case where the outside cap is made of, for example, a resin. Moreover, in the case of the outside cap 32 made of metal, absorbed heat is easily released compared to the case of an outside cap made of a resin, and therefore, the temperature in the package 3 can be stabilized.

As shown in FIG. 10, the outside cap 32 has an outer surface provided with an insulation coating 90. In other words, the infrared sensor 100 includes the insulation coating 90 disposed on the outer surface of the outside cap 32. The insulation coating 90 covers the entirety of the outer surface of the outside cap 32. A material for the insulation coating 90 is, for example, a liquid crystal polymer. The insulation coating 90 is formed on the outer surface of the outside cap 32 by, for example, application. Forming the insulation coating 90 on the outside cap 32 can improve the electric insulation property of the outside cap 32.

The thickness of the insulation coating 90 is less than the thickness of the outside cap 32. The thickness of the insulation coating 90 is less than the thickness of the outside cap 32 by, for example, about one digit. Thus, even when the insulation coating 90 is disposed on the outside cap 32, the stability of the temperature in the package 3 is less likely to be affected.

The insulation coating 90 may be a coating material having an appropriate color. Forming a colored insulation coating 90 on the outer surface of the outside cap 32 can improve the design property of the infrared sensor 100.

(2.4) Inside Cap

The inside cap 4 is electrically conductive. The inside cap 4 is made of metal in this embodiment and is, in particular, made of metal having a high thermal conductivity, such as copper. The inside cap 4 is mounted in the fifth areas 315 of the front surface 310 of the package body 31.

As shown in FIGS. 1, 3, and 4, the inside cap 4 includes a front board 41, a pair of first side boards 42, a pair of second side boards 43, and a pair of attachment boards 44 which are integrally formed as one piece. The inside cap 4 is formed by, for example, performing punching processing and bending processing on one sheet of metal (copper plate).

The front board 41 has a rectangular plate shape. The front board 41 has a size that covers both the first area 311 and the second area 312 (i.e., both the infrared sensor chip 1 and the IC chip 51) when viewed in the first direction D1 (forward/backward direction).

The pair of first side boards 42 extend backward from both sides in the second direction D2 of the front board 41. The front board 41 and each of the first side boards 42 are connected to each other by a curved surface.

The pair of attachment boards 44 extends laterally (outward) from tip ends (rear ends) of the pair of first side boards 42. Each of the first side boards 42 and a corresponding one of the attachment boards 44 are connected to each other by a curved surface. The inside cap 4 is fixed to the package body 31 by bonding the pair of attachment boards 44 to the respective two fifth areas 315 via second bond parts 72 (see FIG. 10). The second bond parts 72 are electrically conductive. The second bond parts 72 are made of, for example, a second adhesive which is electrically conductive. The second adhesive may be, for example, a silver paste.

The inside cap 4 is attached to the package body 31, and in this state, the front board 41 is located in front of the infrared sensor chip 1 and the IC chip 51. In particular, in the thickness direction defined with respect to the package body 31, both the first area 311 and the second area 312 (i.e., both the infrared sensor chip 1 and the IC chip 51) are located within a projection area of an outer perimeter of the front board 41. In sum, the inside cap 4 is disposed between the package body 31 and the outside cap 32 such that the inside cap 4 is in front of, and covers, the infrared sensor chip 1 and the IC chip 51.

As described above, the electrode pads 80 are disposed in the fifth areas 315. Thus, bonding the attachment boards 44 to the package body 31 via the second bond parts 72 electrically connects the inside cap 4 via the second bond parts 72 to the electrode pads 80.

The electrode pads 80 are connected to the ground terminal 40 via a conductive part (the ground line 400) wired in the package body 31 (e.g., in the first interlayer or the second interlayer). That is, the inside cap 4 is electrically connected via the ground line 400 (the conductive part) to the ground terminal 40.

The pair of second side boards 43 extend backward from both sides in the third direction D3 of the front board 41. The length (a protrusion length from the front board 41) of each second side board 43 is less than the length of each first side board 42. Thus, the inside cap 4 is attached to the package body 31, and in this state, a gap is provided between a tip end (rear end) of each second side board 43 and the package body 31. That is, the second side board 43 has a so-called eaves shape. The front board 41 and each of the second side boards 43 are connected to each other by a curved surface. Between each first side board 42 and each second side board 43, a gap (a gap having a cutout shape and extending along the first direction D1) is provided.

As shown in FIGS. 1 and 4, the front board 41 has a portion facing the infrared sensor chip 1 and having the opening 410. As shown in FIGS. 1 and 3, the opening 410 is located between the opening 320 of the outside cap 32 and the infrared sensor chip 1. The opening 410 is a hole allowing the infrared light as the detection target to be detected by the infrared sensor chip 1 to pass therethrough. In other words, the inside cap 4 has a function of transmitting the infrared light as the detection target to be detected by the infrared sensor chip 1.

Moreover, the inside cap 4 is out of contact with the outside cap 32. That is, the outside cap 32 is electrically insulated from the inside cap 4.

The infrared sensor 100 includes the inside cap 4 and can thus transmit some of heat generated from the IC chip 51 via the inside cap 4 to a pixel 102 which is included in the plurality of pixels 102 of the infrared sensor chip 1 and which is away from the IC chip 51. Thus, in the infrared sensor 100, a situation where only the pixels 102 located close to the IC chip 51 are influenced by the heat generated from the IC chip 51 is suppressed from arising, thereby reducing the unevenness of the influence of the heat generated from the IC chip 51 on the infrared sensor chip 1.

Moreover, in the infrared sensor 100, the inside cap 4 is disposed between the infrared sensor chip 1 and the outside cap 32, and therefore, the infrared light radiated from the outside cap 32 is less likely to reach the infrared sensor chip 1. Thus, in the infrared sensor 100 of the present embodiment, the influence of the variation in the temperature at the outside cap 32 on the infrared sensor chip 1 can be reduced, thereby improving the detection accuracy of the infrared sensor chip 1.

Moreover, in the infrared sensor 100, providing the inside cap 4 made of metal can provide an electromagnetic shield function. In particular, in the infrared sensor 100 of the present embodiment, the inside cap 4 is connected to ground. Thus, according to the infrared sensor 100, an electromagnetic wave from an outside (from a location in front) of the infrared sensor 100 toward the infrared sensor chip 1 or the IC chip 51 can be reflected off or absorbed on the inside cap 4, thereby shielding or reducing the electromagnetic wave.

(2.5) Electric Insulation Performance

With reference to FIGS. 1 and 10, the electric insulation performance of the infrared sensor 100 of the present embodiment will be described.

As described above, the outside cap 32 is electrically insulated from the inside cap 4 (ground) and the infrared sensor chip 1. Moreover, the outside cap 32 is electrically insulated from the IC chip 51. In the infrared sensor 100 of the present embodiment, in particular, the outside cap 32 is in a so-called floating state. Thus, in the infrared sensor 100 of the present embodiment, even when the ground potential of the motherboard varies, the potential of the outside cap 32 located outside the infrared sensor 100 is less likely to vary. Thus, the infrared sensor 100 of the present embodiment can suppress the electrical influence on a surrounding environment.

In addition, the infrared sensor 100 of the present embodiment satisfies both the following first distance condition and second distance condition.

The first distance condition is that the shortest distance R1 between the outside cap 32 and the inside cap 4 is less than the shortest distance R3 between the outside cap 32 and the electric circuit 5 (R1<R3). The shortest distance R3 between the outside cap 32 and the electric circuit 5 is a distance between the outside cap 32 and a portion (e.g., part of the conductor line 53), which is closest to the outside cap 32, of the IC chip 51, the connection terminal 52, and the conductor line 53.

The second distance condition is that the shortest distance R2 (see FIG. 10) between the outside cap 32 and the ground line 400 is less than the shortest distance R3 between the outside cap 32 and the electric circuit 5 (R2<R3).

The infrared sensor 100 satisfies the first distance condition. Moreover, in the infrared sensor 100, the dielectric strength of a gas (e.g., air) present between the outside cap 32 and the inside cap 4 is less than the dielectric strength of the insulating substrate (epoxy glass) of the package body 31 present between the outside cap 32 and the electric circuit 5. Thus, in the infrared sensor 100, the insulation resistance between the outside cap 32 and the inside cap 4 is less than the insulation resistance between the outside cap 32 and the electric circuit 5. Thus, even if a short circuit is formed between the outside cap 32 and another component of the infrared sensor 100, the outside cap 32 is short-circuited to the inside cap 4 but not to the electric circuit 5. As described above, the infrared sensor 100 satisfies the first distance condition, and therefore, a failure or the like due to, for example, the short-circuiting is less likely to occur in the electric circuit 5. That is, in the infrared sensor 100, a fail-safe system is implemented.

The infrared sensor 100 satisfies the second distance condition. Moreover, in the infrared sensor 100, the insulating substrate (epoxy glass) of the package body 31 is present between the outside cap 32 and the ground line 400 and between the outside cap 32 and the electric circuit 5. Thus, in the infrared sensor 100, the insulation resistance between the outside cap 32 and the ground line 400 is less than the insulation resistance between the outside cap 32 and the electric circuit 5. Thus, even if a short circuit is formed between the outside cap 32 and another component of the infrared sensor 100, the outside cap 32 is short-circuited to the ground line 400 but not to the electric circuit 5. As explained above, the infrared sensor 100 satisfies the second distance condition, and therefore, a failure or the like due to, for example, the short-circuiting is less likely to occur in the electric circuit 5.

Moreover, the infrared sensor 100 of the present embodiment satisfies the following third distance condition. The third distance condition is that the shortest distance R1 between the outside cap 32 and the inside cap 4 is less than the shortest distance R2 between the outside cap 32 and the ground line 400 (R1<R2). The infrared sensor 100 satisfies the third distance condition, and therefore, even if a short circuit is formed between the outside cap 32 and another component in the infrared sensor 100, the outside cap 32 is short-circuited to the inside cap 4 but not to the ground line 400. Thus, electric breakdown is less likely to occur in the package body 31, thereby protecting the package body 31.

Moreover, in the infrared sensor 100 of the present embodiment, the shortest distance R1 between the outside cap 32 and the inside cap 4 is set to be greater than or equal to 0.3 mm and less than or equal to 1.0 mm.

Figure 11:
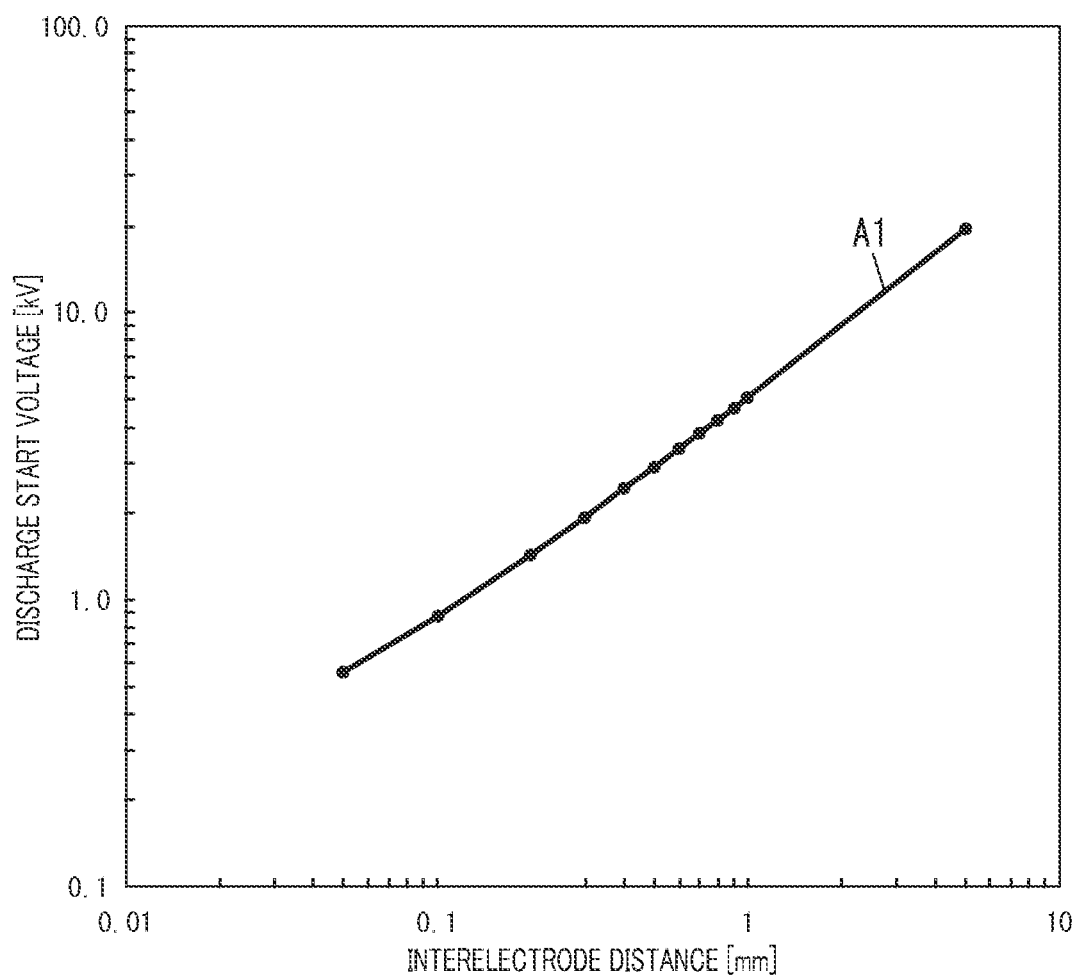
FIG. 11 is a view for illustrating Paschen's law.

The shortest distance R1 greater than or equal to the lower limit value (0.3 mm) of the range enables the infrared sensor 100 to have a prescribed withstand voltage performance. In general, it is known that there is a relationship, called Paschen's law, shown in FIG. 11 between the distance between the pair of electrodes (interelectrode distance) and the magnitude of a voltage (discharge start voltage) whose application between the pair of electrodes may cause discharge between the electrodes. In FIG. 11, A1 denotes a curved line of the discharge start voltage in the case of a medium between the pair of electrodes being air (atmospheric pressure 1 atm). From FIG. 11, it can be seen that when the shortest distance R1 is greater than or equal to 0.3 mm, the discharge start voltage can be greater than or equal to 1.5 kV, thereby satisfying the withstand voltage performance specified in JIS C 6950-1:2012.

Moreover, when the shortest distance R1 is less than or equal to the upper limit value (1.0 mm) of the range, the size of the infrared sensor 100 can be suppressed from increasing.

The shortest distance R1 is more preferably greater than or equal to 0.4 mm and less than or equal to 0.7 mm. The shortest distance R1 is much more preferably 0.5 mm.

As explained above, in the infrared sensor 100 of the present embodiment, the outside cap 32 is electrically insulated from the inside cap 4 and the infrared sensor chip 1, and the inside cap 4 is electrically connected to the ground terminal 40. Thus, in the infrared sensor 100 of the present embodiment, even when the ground potential of the motherboard varies, the potential of the outside cap 32 located outside the infrared sensor 100 is less likely to vary. That is, the infrared sensor 100 of the present embodiment can suppress the electrical influence on a surrounding environment.

(3) Variations

The embodiment described above is a mere example of various embodiments of the present disclosure. Various modifications may be made to the embodiment described above depending on design and the like as long as the object of the present disclosure is achieved. Variations of the embodiment described above are enumerated below. Note that the variations described below are applicable accordingly in combination with the embodiment and described above and other variations. In the following description, the embodiment described above may be referred to as a "basic example".

In a variation, the infrared sensor 100 may further include a thermistor. The thermistor is disposed in the vicinity of the infrared sensor chip 1 to sense the temperature of the cold junction T2 of the infrared sensor chip 1. For example, the thermistor is mounted on the front surface 310 of the package body 31 to be aligned with the infrared sensor chip 1 side by side in the third direction D3. The IC chip 51 is configured to perform signal processing of an output signal of the thermistor in addition to the detection signal of the infrared sensor chip 1.

In a variation, the lens 6 may be attached to the inside cap 4 instead of the outside cap 32. In this case, for example, the opening 320 of the outside cap 32 may be closed with a member (e.g., a silicon substrate or a molded product of polyethylene) which is transparent to infrared light.

In a variation, the connection terminal 52 may be disposed on an inner side (area surrounded by the sixth area 316) of the projection area of the sixth area 316 in the first direction D1 (forward/backward direction). That is, the connection terminal 52 may be disposed in the projection area of the internal space of the package 3 in the first direction D1.

In a variation, the entirety of the conductor line 53 may be disposed on an inner side (area surrounded by the sixth area 316) of the projection area of the sixth area 316 in the first direction D1. That is, the conductor line 53 may be disposed in the projection area of the internal space of the package 3 in the first direction D1.

(4) Aspects

The embodiment, variations, and the like described above disclose the following aspects.

An infrared sensor (100) of a first aspect includes a package body (31), an infrared sensor chip (1), an outside cap (32), and an inside cap (4). The infrared sensor chip (1) is mounted on a front surface (310) of the package body (31). The outside cap (32) is electrically conductive. The outside cap (32) is attached to the package body (31) such that the outside cap (32) is in front of, and covers, the infrared sensor chip (1). The outside cap (32) has a function of transmitting infrared light which is a detection target to be detected by the infrared sensor chip (1). The inside cap (4) is electrically conductive. The inside cap (4) is disposed between the package body (31) and the outside cap (32) such that the inside cap (4) is in front of, and covers, the infrared sensor chip (1). The inside cap (4) has a function of transmitting the infrared light which is the detection target to be detected by the infrared sensor chip (1). The package body (31) includes a ground terminal (40). The ground terminal (40) is to be connected to external ground. The outside cap (32) is electrically insulated from the inside cap (4) and the infrared sensor chip (1). The inside cap (4) is electrically connected to the ground terminal (40).

With this aspect, even when the ground potential of a motherboard varies, the potential of the outside cap (32) constituting an outer side of the infrared sensor (100) is less likely to vary. In sum, this aspect has the advantage that the electrical influence of the infrared sensor (100) on a surrounding environment is suppressed (reduced).

An infrared sensor (100) of a second aspect referring to the first aspect further includes an electric circuit (5). The electric circuit (5) includes an IC chip (51), a connection terminal (52), and a conductor line (53). The IC chip (51) is configured to perform signal processing of a detection signal of the infrared sensor chip (1). The connection terminal (52) is configured to output an output signal of the IC chip (51) to an outside. The conductor line (53) electrically connects the IC chip (51) to the connection terminal (52). An insulation resistance between the outside cap (32) and the inside cap (4) is less than an insulation resistance between the outside cap (32) and the electric circuit (5).

This aspect enables the occurrence of a failure in the electric circuit (5) to be suppressed.

An infrared sensor (100) of a third aspect referring to the first aspect further includes an electric circuit (5). The electric circuit (5) includes an IC chip (51), a connection terminal (52), and a conductor line (53). The IC chip (51) is configured to perform signal processing of a detection signal of the infrared sensor chip (1). The connection terminal (52) is configured to output an output signal of the IC chip (51) to an outside. The conductor line (53) electrically connects the IC chip (51) to the connection terminal (52). A shortest distance (R1) between the outside cap (32) and the inside cap (4) is less than a shortest distance (R3) between the outside cap (32) and the electric circuit (5).

This aspect enables the occurrence of a failure in the electric circuit (5) to be suppressed.

An infrared sensor (100) of a fourth aspect referring to the third aspect further includes a ground line (400). The ground line (400) electrically connects the inside cap (4) to the ground terminal (40). The shortest distance (R1) between the outside cap (32) and the inside cap (4) is less than a shortest distance (R2) between the outside cap (32) and the ground line (400).

This aspect enables the occurrence of a failure in the electric circuit (5) to be suppressed.

In an infrared sensor (100) of a fifth aspect referring to any one of the first to fourth aspects, a shortest distance (R1) between the outside cap (32) and the inside cap (4) is greater than or equal to 0.3 mm and less than or equal to 1.0 mm.

This aspect enables the withstand voltage performance of the infrared sensor (100) to be improved.

An infrared sensor (100) of a sixth aspect referring to any one of the first to fifth aspects further includes a lens (6). The lens (6) is disposed in front of the infrared sensor chip (1). The lens (6) is configured to concentrate the infrared light as the detection target onto the infrared sensor chip (1).

This aspect enables the detection accuracy of the infrared light by the infrared sensor chip (1) to be improved.

An infrared sensor (100) of a seventh aspect referring to any one of the first to sixth aspects further includes an insulation coating (90). The insulation coating is disposed outside the outside cap (32).

This aspect enables the electric insulation performance of the outside cap (32) to be improved.

REFERENCE SIGNS LIST

1 Infrared Sensor Chip
31 Package Body
310 Front Surface
32 Outside Cap
4 Inside Cap
40 Ground Terminal
400 Ground Line
5 Electric Circuit
51 IC Chip
52 Connection Terminal
53 Conductor Line
6 Lens
90 Insulation Coating
100 Infrared Sensor
R1 Shortest Distance
R2 Shortest Distance
R3 Shortest Distance

The invention claimed is:

1. An infrared sensor comprising:
a package body;
an infrared sensor chip mounted on a front surface of the package body;
an outside cap which is electrically conductive and which has a function of transmitting infrared light which is a detection target to be detected by the infrared sensor chip, the outside cap being attached to the package body such that the outside cap is in front of, and covers, the infrared sensor chip; and
an inside cap which is electrically conductive and which has a function of transmitting the infrared light which is the detection target to be detected by the infrared sensor chip, the inside cap being disposed between the package body and the outside cap such that the inside cap is in front of, and covers, the infrared sensor chip,
the package body including a ground terminal to be connected to external ground,
the outside cap being electrically insulated from the inside cap and the infrared sensor chip,
the inside cap being electrically connected to the ground terminal.

2. The infrared sensor of claim 1, further comprising
an electric circuit including
an IC chip configured to perform signal processing of a detection signal of the infrared sensor chip,
a connection terminal configured to output an output signal of the IC chip to an outside, and
a conductor line electrically connecting the IC chip to the connection terminal, wherein
an insulation resistance between the outside cap and the inside cap is less than an insulation resistance between the outside cap and the electric circuit.

3. The infrared sensor of claim 1, further comprising
an electric circuit including
an IC chip configured to perform signal processing of a detection signal of the infrared sensor chip,
a connection terminal configured to output an output signal of the IC chip to an outside, and
a conductor line electrically connecting the IC chip to the connection terminal, wherein
a shortest distance between the outside cap and the inside cap is less than a shortest distance between the outside cap and the electric circuit.

4. The infrared sensor of claim 3, further comprising a ground line electrically connecting the inside cap to the ground terminal, wherein
the shortest distance between the outside cap and the ground line is less than a shortest distance between the outside cap and the electric circuit.

5. The infrared sensor of claim 1, wherein
a shortest distance between the outside cap and the inside cap is greater than or equal to 0.3 mm and less than or equal to 1.0 mm.

6. The infrared sensor of claim 1, further comprising a lens disposed in front of the infrared sensor chip, wherein
the lens is configured to concentrate the infrared light as the detection target onto the infrared sensor chip.

7. The infrared sensor of claim 1, further comprising an insulation coating disposed on an outer surface of the outside cap.

* * * * *